United States Patent
Pal et al.

(10) Patent No.: US 11,614,328 B2
(45) Date of Patent: Mar. 28, 2023

(54) SENSING DEVICE

(71) Applicant: Panasonic Intellectual Property Management Co., Ltd., Osaka (JP)

(72) Inventors: Sagnik Pal, Marlborough, MA (US); Diego Emilio Serrano, Peachtree City, GA (US); Thomas Kieran Nunan, Carlisle, MA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 17/420,790

(22) PCT Filed: Dec. 27, 2019

(86) PCT No.: PCT/JP2019/051458
§ 371 (c)(1),
(2) Date: Jul. 6, 2021

(87) PCT Pub. No.: WO2020/145202
PCT Pub. Date: Jul. 16, 2020

(65) Prior Publication Data
US 2022/0128359 A1 Apr. 28, 2022
US 2022/0349712 A9 Nov. 3, 2022

Related U.S. Application Data

(60) Provisional application No. 62/789,547, filed on Jan. 8, 2019, provisional application No. 62/789,551, filed on Jan. 8, 2019.

(51) Int. Cl.
*G01P 1/00* (2006.01)
*G01C 19/5712* (2012.01)
*G01P 15/125* (2006.01)

(52) U.S. Cl.
CPC ............ *G01C 19/5712* (2013.01); *G01P 1/00* (2013.01); *G01P 15/125* (2013.01)

(58) Field of Classification Search
CPC ... G01C 19/5712; G01C 19/5755; G01P 1/00; G01P 15/125
See application file for complete search history.

(56) References Cited

U.S. PATENT DOCUMENTS 6,840,106 B1 * 1/2005 McNeil .................. G01P 15/18
73/514.32
7,543,496 B2 6/2009 Ayazi et al.
(Continued)

OTHER PUBLICATIONS

International Search Report issued in Patent Application No. PCT/JP2019/051458 dated Feb. 4, 2020.
(Continued)

*Primary Examiner* — David J Bolduc
(74) *Attorney, Agent, or Firm* — Pearne & Gordon LLP

(57) ABSTRACT

A sensing device includes an anchor having a central axis that defines a first radial direction and a second radial direction, and a resonant member flexibly supported by the anchor that includes a main body made of a single-crystal solid. The main body has a first material stiffness in the first radial direction and a second material stiffness in the second radial direction that is less than the first material stiffness. Moreover, the main body has a first component stiffness in the first radial direction and a second component stiffness in the second radial direction that is substantially similar to the first component stiffness. Another sensing device includes a resonant member having a main body that defines an aperture extending through the main body, and an electrode located in the aperture such that a capacitive channel is defined between the electrode and the main body that circumscribes the electrode.

19 Claims, 7 Drawing Sheets

(56) References Cited

U.S. PATENT DOCUMENTS

| | | |
|---|---|---|
| 7,578,189 B1 | 8/2009 | Mehregany |
| 7,892,876 B2 | 2/2011 | Mehregany |
| 8,166,816 B2 | 5/2012 | Ayazi et al. |
| 8,173,470 B2 | 5/2012 | Mehregany |
| 8,372,677 B2 | 2/2013 | Mehregany |
| 8,528,404 B2 | 9/2013 | Ayazi |
| 9,476,711 B2* | 10/2016 | Lin .................... G01C 19/5712 |
| 9,923,545 B2 | 3/2018 | Clark |
| 2006/0032310 A1* | 2/2006 | Merassi ................ B81B 7/0048 257/734 |
| 2006/0101909 A1* | 5/2006 | Lo ...................... G01C 19/5712 73/497 |
| 2009/0256297 A1* | 10/2009 | Geisberger ............ G01P 15/125 267/160 |
| 2010/0107763 A1* | 5/2010 | Lin ........................ G01P 15/18 73/514.32 |
| 2010/0154541 A1* | 6/2010 | Cazzaniga ......... G01C 19/5712 73/504.12 |
| 2013/0075237 A1* | 3/2013 | Gutierrez ............. G01P 15/097 200/181 |
| 2013/0139592 A1* | 6/2013 | Acar ................... B81C 1/00134 257/415 |
| 2015/0168146 A1 | 6/2015 | Shcheglov et al. |
| 2016/0084872 A1* | 3/2016 | Naumann ............... G01P 15/18 73/514.01 |
| 2016/0097792 A1* | 4/2016 | Naumann ............... G01P 15/18 73/504.02 |
| 2016/0207757 A1* | 7/2016 | Merassi .................. G01P 1/006 |
| 2016/0216290 A1* | 7/2016 | Tang ..................... G01P 15/125 |
| 2016/0327390 A1* | 11/2016 | Serrano ............. G01C 19/5698 |
| 2018/0031602 A1* | 2/2018 | Huang ................... G01P 15/13 |
| 2018/0038692 A1* | 2/2018 | Prati .................... G01C 19/574 |
| 2018/0340775 A1* | 11/2018 | Kuisma ............. G01C 19/5642 |
| 2019/0049247 A1* | 2/2019 | Huang .............. G01C 19/5712 |
| 2019/0072389 A1* | 3/2019 | Prati ................. G01C 19/5712 |
| 2019/0360808 A1* | 11/2019 | Seshia ............... G01C 19/5684 |

OTHER PUBLICATIONS

Written Opinion issued in Patent Application No. PCT/JP2019/051458 dated Feb. 4, 2020.

D. E. Serrano et al, "Substrate-decoupled, bulk-acoustic wave gyroscopes: Design and evaluation of next-generation environmentally robust devices", Microsystems & Nanoengineering, Apr. 2016, pp. 1-10, vol. 2.

R. F. Pierret, "Advanced Semiconductor Fundamentals", Prentice Hall, 2002, pp. 1-221, 2nd edition, vol. 6, New Jersey.

M. A. Hopcroft et al, "What is the Young's Modulus of Silicon?", Journal of Microelectromechanical Systems, Apr. 2010, pp. 229-238, vol. 19, No. 2.

* cited by examiner

[Fig. 1]
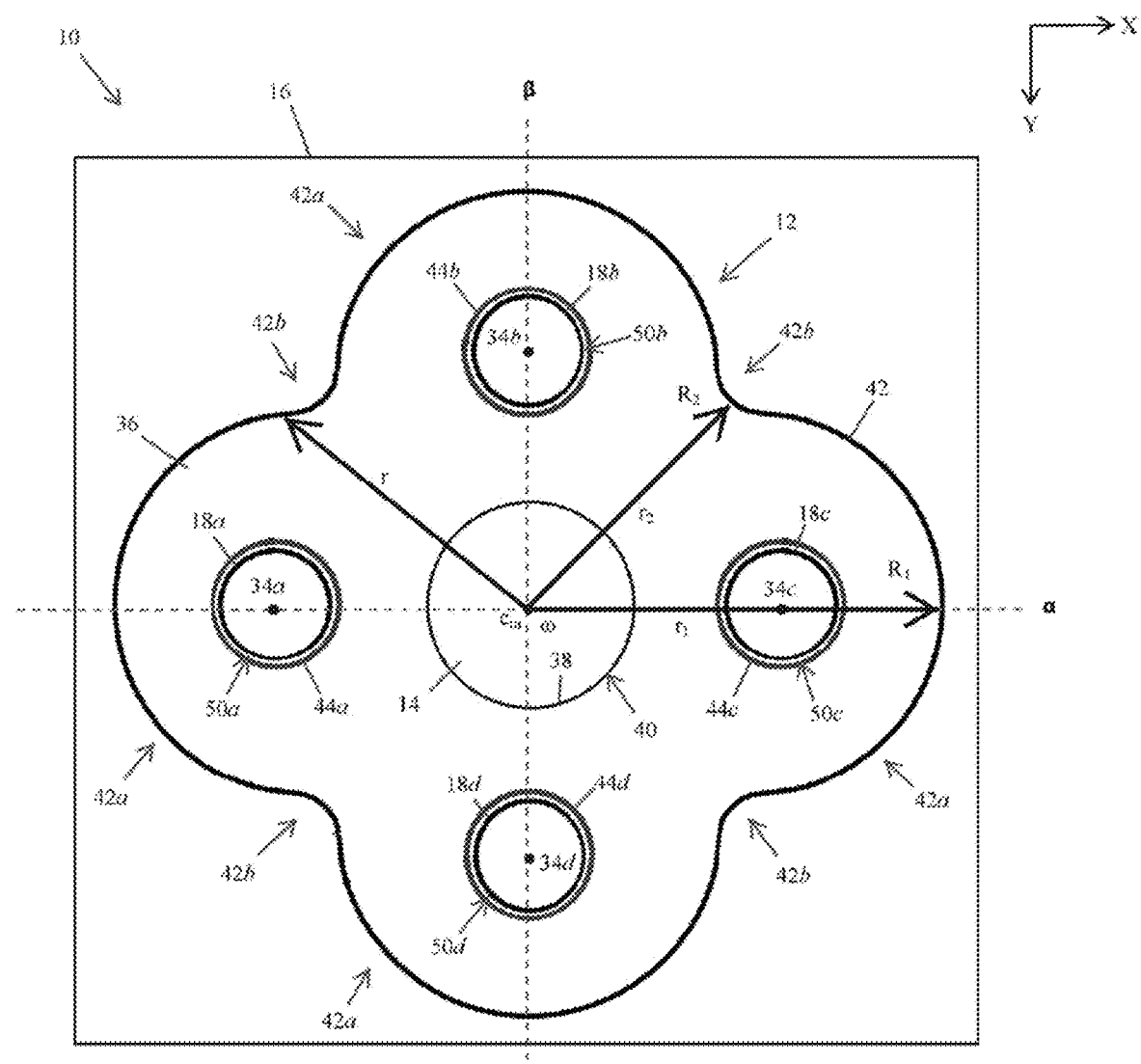

[Fig. 2]
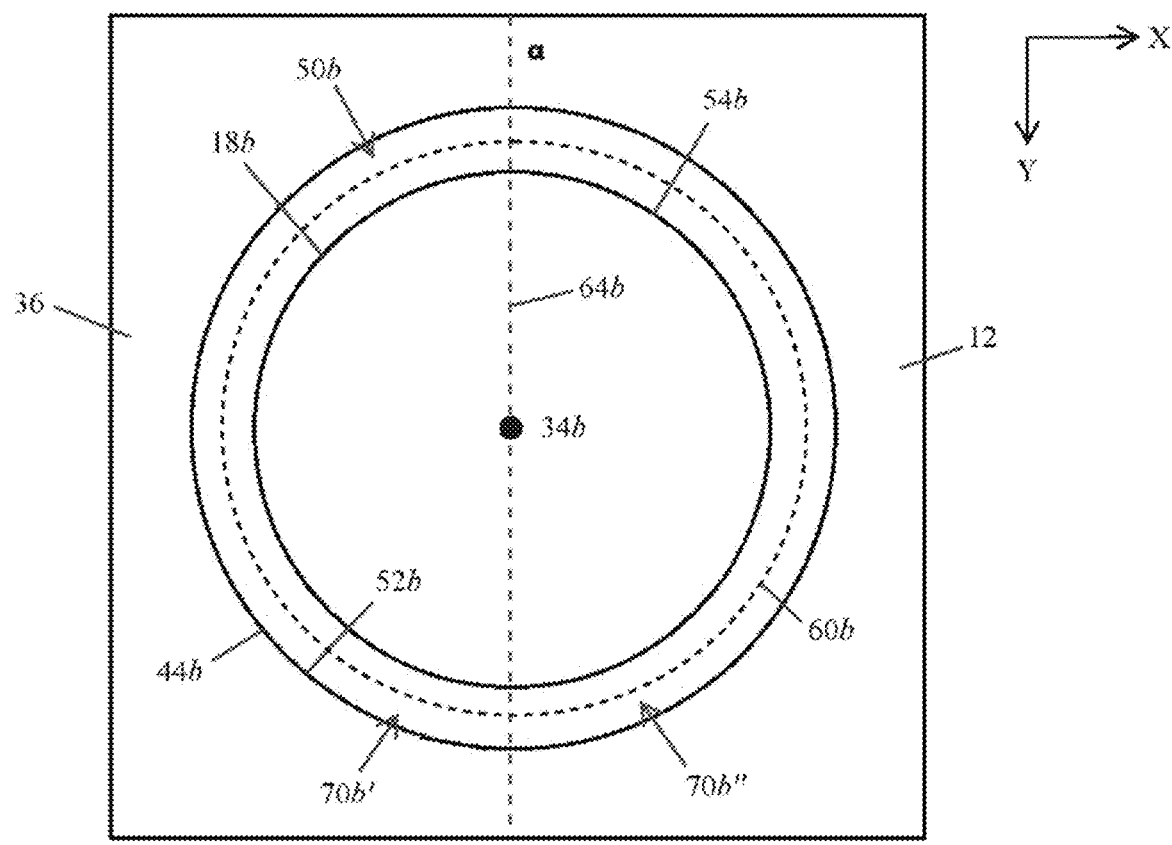

[Fig. 3]
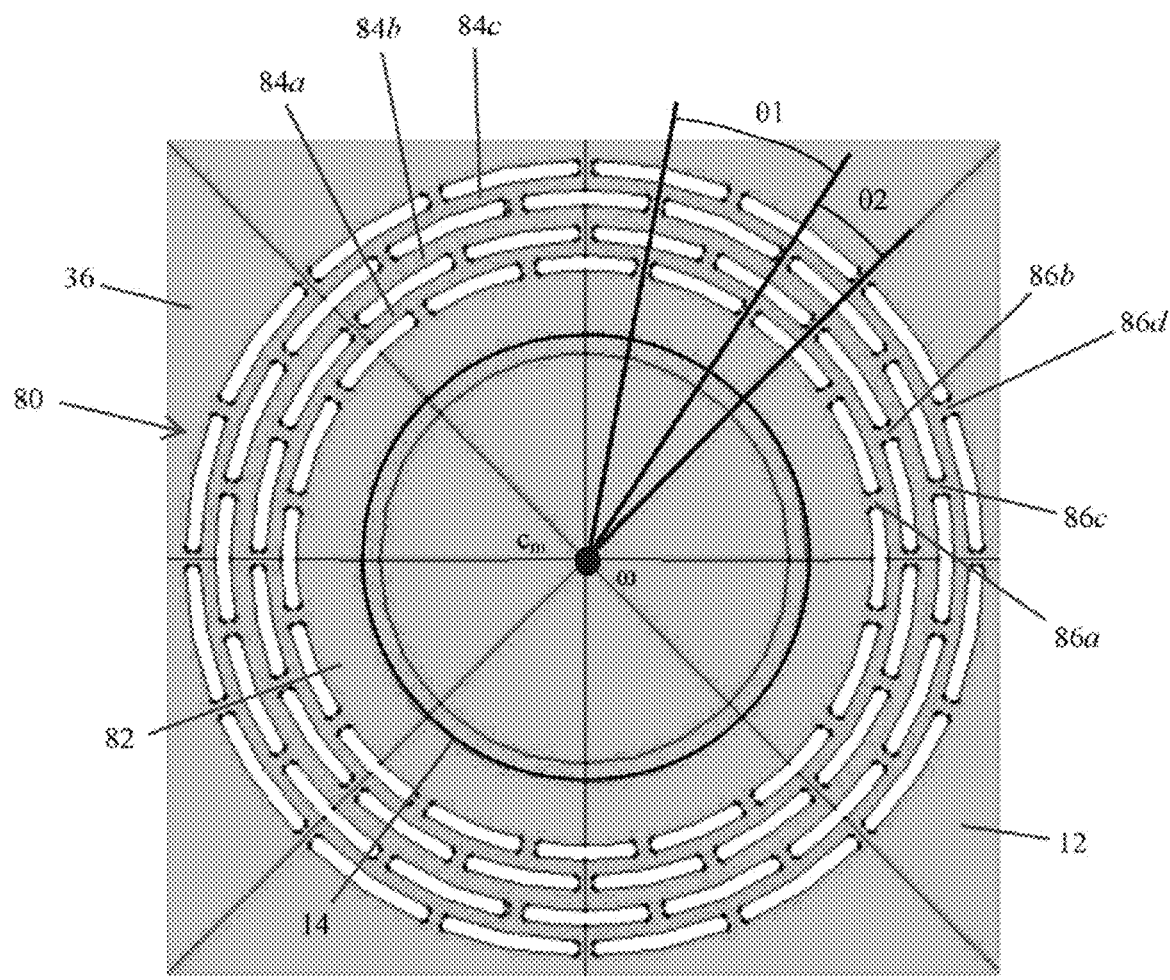

[Fig. 4]
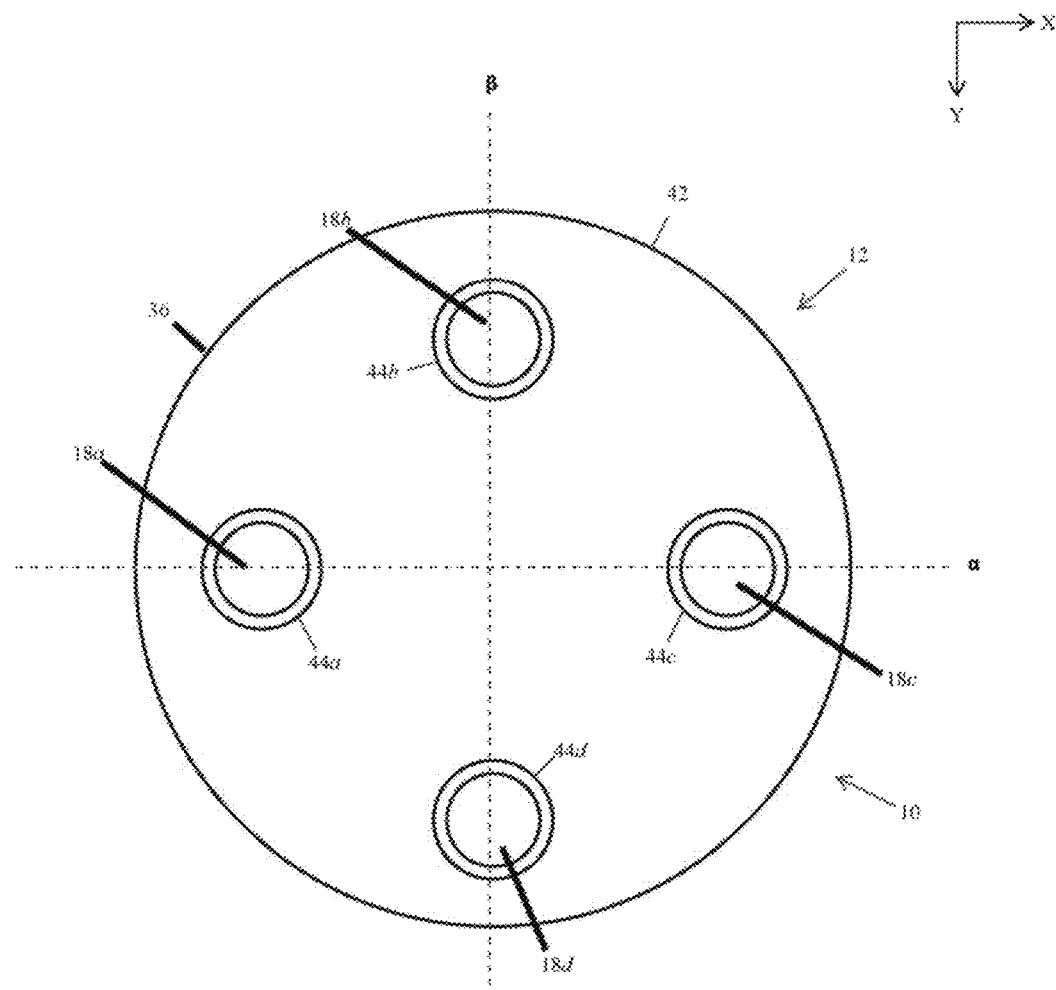

[Fig. 5]
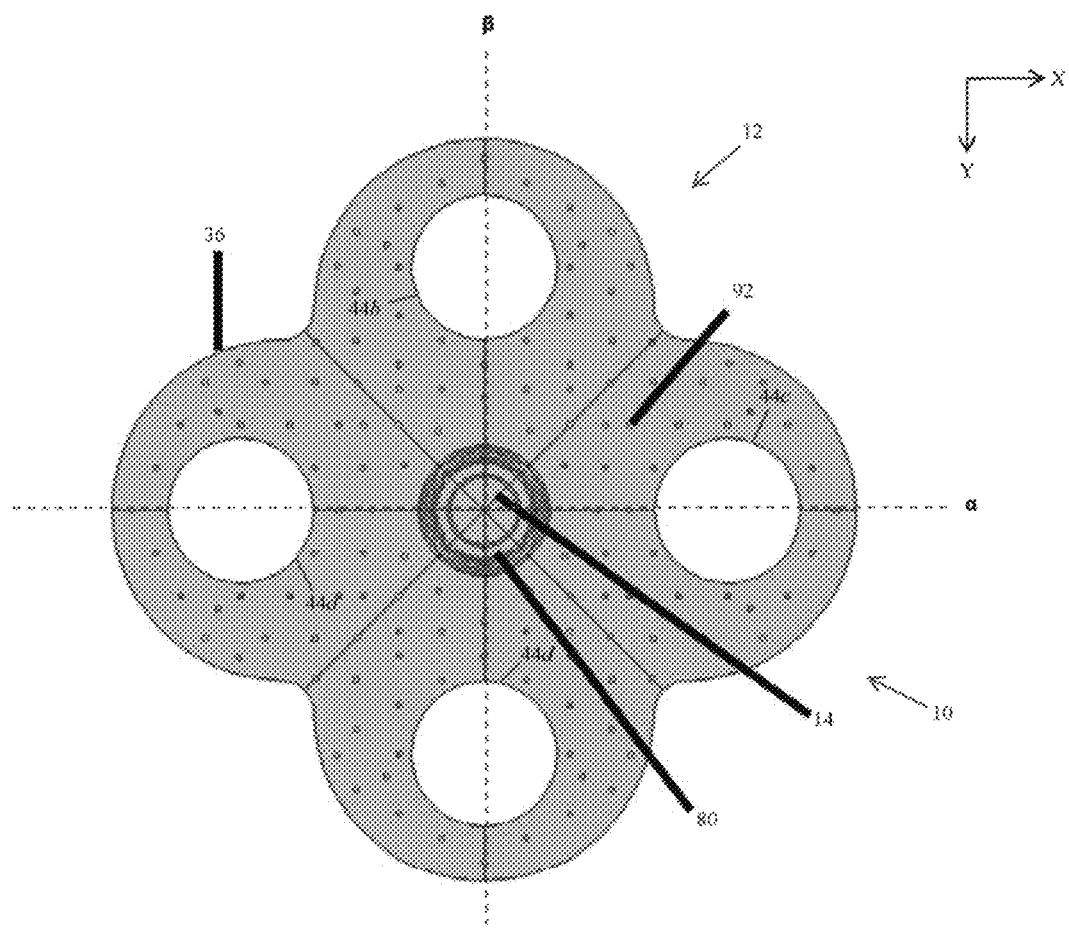

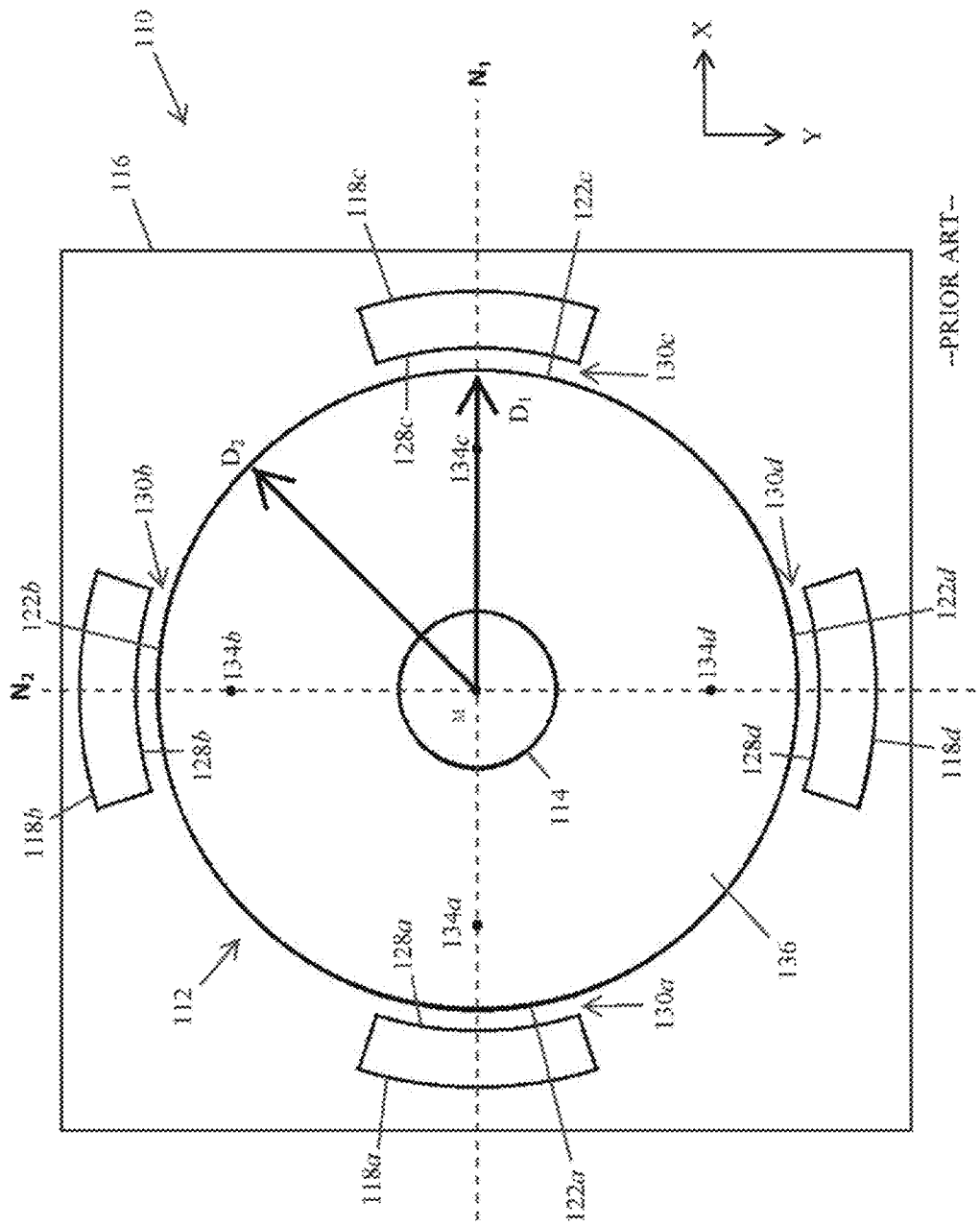
[Fig. 6]

[Fig. 7]
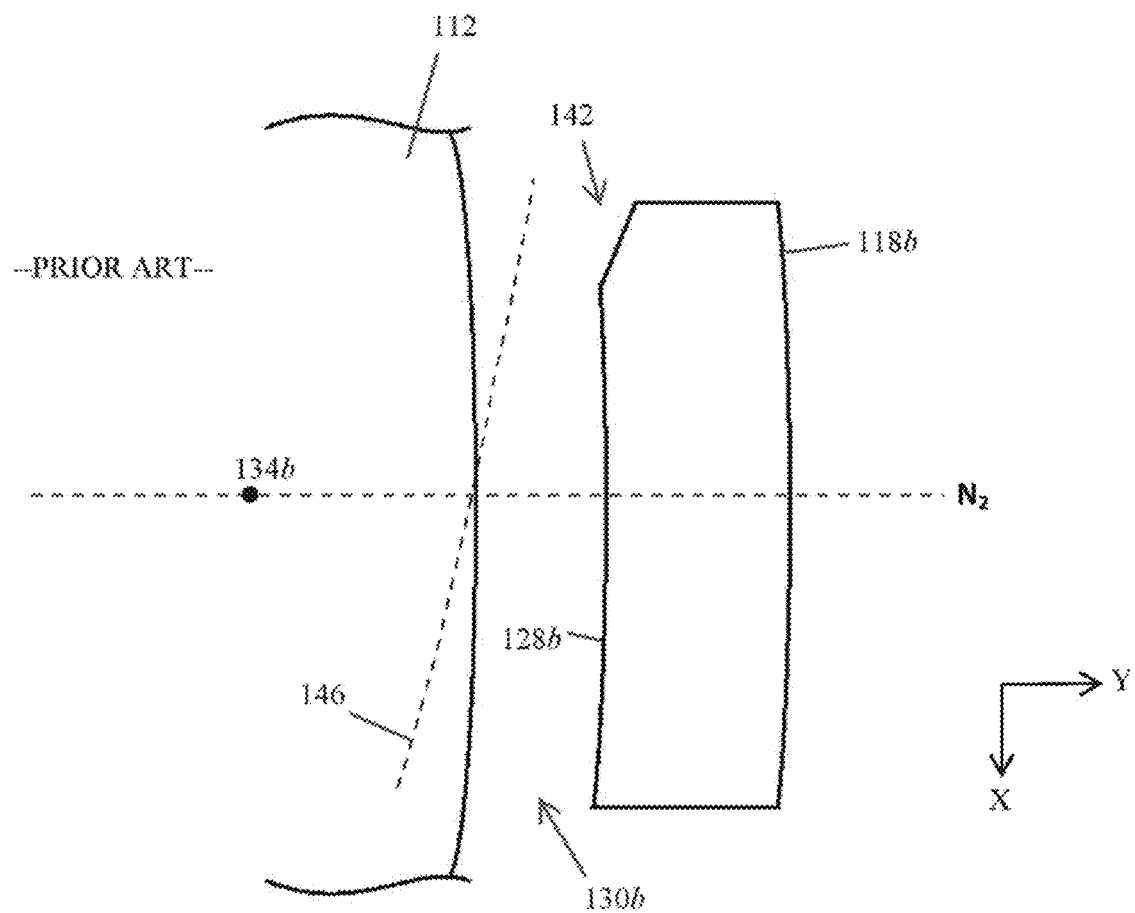

SENSING DEVICE

This application is a U.S. national stage application of the PCT International Application No. PCT/JP2019/051458 filed on Dec. 27, 2019, which claims the benefit of priority of U.S. provisional Applications No. 62/789,547 filed on Jan. 8, 2019 and No. 62/789,551 filed on Jan. 8, 2019, the contents all of which are incorporated herein by reference.

TECHNICAL FIELD

This application relates generally to a sensing device and more particularly, a sensing device such as a MEMS gyroscope or MEMS accelerometer.

BACKGROUND ART

Inertial measurement devices, such as gyroscopes and accelerometers, provide high-precision sensing. However, historically their cost, size, and power requirements have prevented their widespread use in industries such as consumer products, gaming devices, automobiles, and handheld positioning systems.

More recently, micro-electro-mechanical systems (MEMS) sensor devices have been gaining increased attention from multiple industries since micro-machining technologies have made fabrication of miniature gyroscopes and accelerometers possible. Miniaturization also enables integration of MEMS devices with readout electronics on the same die, resulting in reduced size, cost, and power consumption as well as improved resolution by reducing noise. Consumer products such as digital cameras, 3D gaming equipment, and automotive sensors are employing MEMS devices because of their numerous advantages. The demand for low cost, more sophisticated, and user-friendly devices by the consumers has caused a steep rise in the demand of MEMS sensors, as they offer adequate reliability and performance at very low prices. State-of-the-art MEMS devices, such as those disclosed in PTLs 1-7, are able to sense rotational (i.e. angle or angular velocity of rotation around an axis) or translational motion (i.e. linear acceleration along an axis) around and along axes. These devices typically include a resonant member surrounded by a plurality of electrodes that are spaced from the resonator by a capacitive gap.

For instance, a sensing device 110 is illustrated in FIG. 6 that corresponds to a MEMS gyroscope, and includes a resonant member 112, an anchor 114 that supports the resonant member 112 relative to a substrate 116, and a plurality of electrodes 118 that are spaced from the resonant member 112. Each electrode 118 is capacitively coupled to the resonant member 112.

More specifically, the resonant member 112 has a plurality of capacitive surface portions 122 that each face and are capacitively coupled to an associated capacitive surface portion 128 of an electrode 118. A capacitive channel 130 is thereby defined between the resonant member 112 and each electrode 118.

The resonant member 112 is movable in two resonant modes—a drive mode and a sense mode. In particular, two of the electrodes 118a, 118c are drive electrodes that are operable to apply a driving force to the resonant member 112 in an X direction so as to excite the resonant member 112 and vibrate the resonant member 112 in the drive mode at its natural frequency. If the resonant member 112 is rotated, the Coriolis Effect will transfer energy from the drive mode to the sense mode and cause the resonant member 112 to vibrate in the sense mode. Moreover, two of the electrodes 118b, 118d are sense electrodes that are configured to generate a current in response to sense-mode movement of the resonant member 112 in a Y direction that is perpendicular to the X direction. This current can thus be analyzed to determine the rotation rate of the resonant member 112.

Each electrode 118 is aligned with a node axis of the resonant member 112 (for the purposes of this disclosure, a "node axis" of a resonant member is an axis that passes through two or more node points of the resonant member, and a "node point" refers to either an antinode or node of the resonant member when vibrating in the drive mode or sense mode). More specifically, the drive electrodes 118a, 118c are aligned with a first node axis $N_1$ that passes through two node points 134a, 134c of the resonant member 112, and the sense electrodes 118b, 118d are aligned with a second node axis $N_2$ that passes through two other node points 134b, 134d of the resonant member 112. The two node points 134a, 134c correspond to nodes of the resonant member 112 in sense mode and antipodes of the resonant member 112 in drive mode, while the other two node points 134b, 134d correspond to antinodes of the resonant member 112 in sense mode and nodes of the resonant member 112 in drive mode. Moreover, the capacitive surface portions 122, 128 of the resonant member 112 and electrodes 118 are preferably shaped and arranged such that their capacitive channels 130 are symmetrical about their associated node points 134 and node axes.

Ideally, the sense mode will not be excited when the resonant member 112 is under zero rate (i.e., no rotation), such that sense-mode movement of the resonant member 112 in the Y direction is zero and no current output is generated at the sense electrodes 118b, 118d that would falsely indicate rotation. However, as discussed further below, some excitation of the sense electrodes 118b, 118d can occur even when the resonant member 112 is under zero rate. For example, the sensing device 110 in FIG. 6 is typically manufactured using an etching process that divides a single body of material into the resonant member 112 and electrodes 118. The capacitive channels 130 are formed at the locations of the single body that are etched, along with the capacitive surface portions 122, 128 of the resonant member 112 and electrodes 118. As noted above, the capacitive surface portions 122, 128 of the resonant member 112 and electrodes 118 are preferably shaped and arranged such that their capacitive channels 130 are symmetrical about their associated node axes. However, due to imperfections that arise in the fabrication process when forming the ends of each channel 130, the capacitive surface portions 122, 128 can have imperfections at the ends of each channel 130 that result in asymmetries of the channel 130 about its associated node axe.

FIG. 7 shows an example wherein an imperfection 142 is formed in the capacitive surface portion 128b of the sense electrode 118b such that its capacitive channel 130b is not symmetrical about the second node axis $N_2$. When the drive electrodes 118a, 118c are operated to excite the resonant member 112 in drive mode, some drive mode movement will be experienced at the capacitive surface portion 122b of the resonant member 112 (see e.g., broken line 146 in FIG. 7 indicating drive-mode movement of the resonant member 112). If the capacitive channel 130b for the sense electrode 118b was symmetrical about the second node axis $N_2$, the effective capacitive displacement of the capacitive surface portion 122b would be zero, thereby resulting in a zero current at the sense electrode 118b. However, because the capacitive channel 130b is not symmetrical, effective capacitive displacement of the capacitive surface portion 122b will be non-zero, thereby producing a zero-rate output (ZRO) at the sense electrode 118b that falsely indicates rotation of the resonant member 112 and can change over time and temperature. Additionally, if there is asymmetry in one or both of the capacitive channels 130a, 130c for the drive electrodes 118a, 118c, this asymmetry can cause the drive electrodes 118a, 118c to also excite sense-mode movement of the resonant member 112 under zero rate, which can further produce a ZRO at the sense electrodes 118b, 118d (even if the capacitive channels 130b, 130d for the sense electrodes 118b, 118d are perfectly symmetrical).

Another potential problem with the sensing device 110 in FIG. 6 relates to anisotropic stiffness of its resonant member 112. More specifically, the resonant member 112 includes a main body 136 that can be made of a single-crystal solid (e.g., silicon). The single-crystal structure of this base material causes the resonant member 112 to have material and component stiffnesses that are direction dependent (for the purposes of this disclosure, it is to be appreciated that "component stiffness" of an object refers to the overall stiffness of the object, while "material stiffness" of an object refers to the stiffness/Young's modulus of the object's underlying material).

For instance, the main body 136 in FIG. 6 has a material stiffness that varies radially about a central axis M of the anchor 114 such that the main body 136 has a first material stiffness in a first radial direction $D_1$ and a second material stiffness in a second radial direction $D_2$ that is less than the first material stiffness. The angle between the first and second radial directions $D_1$, $D_2$ is about 45 degrees, and material stiffnesses of the main body 136 along intermediate radial directions will gradually transition from the first material stiffness in the first radial direction $D_1$ to the second material stiffness in the second radial direction $D_2$. Moreover, the material stiffness of the main body 136 will periodically alternate between the first and second material stiffnesses every further 45 degrees about the central axis M Consequently, the main body 136 has a component stiffness that will similarly vary periodically about the central axis M, such that the main body 136 has a first component stiffness in the first radial direction $D_1$ and a second component stiffness in the second radial direction $D_2$ that is less than the first component stiffness. This anisotropic component stiffness of the main body 136 about the central axis M of the anchor 114 will cause stiffer regions of the main body 136 to displace shorter distances during vibration than regions of the main body 136 that are more flexible, which in turn can create an imbalance of momentum forces at the anchor 114 that generate stress and lead to energy losses from the resonant member 112.

CITATION LIST

Patent Literature

[PTL 1]
U.S. Pat. No. 7,543,496
[PTL 2]
U.S. Pat. No. 7,578,189
[PTL 3]
U.S. Pat. No. 7,892,876
[PTL 4]
U.S. Pat. No. 8,173,470
[PTL 5]
U.S. Pat. No. 8,372,677
[PTL 6]
U.S. Pat. No. 8,528,404
[PTL 7]
U.S. Pat. No. 8,166,816

SUMMARY OF INVENTION

The following presents a simplified summary of example embodiments of the invention. This summary is not intended to identify critical elements of the invention or to delineate the scope of the invention. The sole purpose of the summary is to present some example embodiments in simplified form as a prelude to the more detailed description that is presented later.

According to a first aspect, a sensing device includes an anchor having a central axis that defines a first radial direction and a second radial direction, and a resonant member flexibly supported by the anchor that includes a main body made of a single-crystal solid. The main body has a first material stiffness in the first radial direction and a second material stiffness in the second radial direction that is less than the first material stiffness. Moreover, the main body has a first component stiffness in the first radial direction and a second component stiffness in the second radial direction that is substantially similar to the first component stiffness.

In one example of the first aspect, the resonant member is movable in a resonant mode and the main body of the resonant member is shaped such that a net momentum force applied to the anchor from the resonant member from vibration in the resonant mode is 0.1 pN or less.

In one example of the first aspect, a first distance between the central axis and an outer perimeter of the main body in the first radial direction is greater than a second distance between the central axis and the outer perimeter of the main body in the second radial direction.

In another example of the first aspect, the main body defines an aperture located along the first radial direction that extends through the main body. In one example, the main body has no aperture located along the second radial direction between an inner perimeter and outer perimeter of the main body. In one example, the sensing device includes an electrode capacitively coupled to the resonant member, wherein the electrode is located in the aperture such that a capacitive channel is defined between the electrode and the main body that circumscribes the electrode. In one example, the electrode is capacitively coupled to the main body about an entire outer perimeter of the electrode. In one example, the capacitive channel has a line of symmetry that is substantially parallel to a drive direction of the resonant member.

In yet another example of the first aspect, the single-crystal solid is silicon. In one example, the single-crystal solid is (100) oriented silicon.

In still yet another example of the first aspect, an angle between the first radial direction and second radial direction is about 45 degrees.

In another example of the first aspect, a gyroscope includes the sensing device.

According to a second aspect, a sensing device includes an anchor having a central axis that defines a first radial direction and a second radial direction, and a resonant member flexibly supported by the anchor that includes a main body made of a single-crystal solid. The resonant member is movable in a resonant mode and the main body of the resonant member is shaped such that a net momentum force applied to the anchor from the resonant member from vibration in the resonant mode is 0.1 pN or less.

According to a third aspect, a sensing device includes a resonant member having a main body that defines an aperture extending through the main body, and an electrode capacitively coupled to the resonant member. The electrode is located in the aperture such that a capacitive channel is defined between the electrode and the main body that circumscribes the electrode.

In one example of the third aspect, the electrode is capacitively coupled to the main body about an entire outer perimeter of the electrode.

In another example of the third aspect, the capacitive channel follows a continuous path and has a width that is substantially constant along the continuous path.

In yet another example of the third aspect, the capacitive channel has a line of symmetry that is substantially parallel to a drive direction of the resonant member.

In still yet another example of the third aspect, the sensing device includes an anchor having a central axis that defines a first radial direction and a second radial direction. The resonant member is flexibly supported by the anchor, the main body of the resonant member is made of a single-crystal solid and has a first material stiffness in the first radial direction and a second material stiffness in the second radial direction that is less than the first stiffness, and the aperture is located along the first direction. In one example, a first distance between the central axis and an outer perimeter of the main body in the first radial direction is greater than a second distance between the central axis and the outer perimeter of the main body in the second radial direction. In another example of the third aspect, a gyroscope includes the sensing device.

According to a fourth aspect, a sensing device includes a resonant member having a main body that defines a pair of first apertures and a pair of second apertures extending through the main body; a pair of first electrodes capacitively coupled to the resonant member that are arranged respectively in the pair of first apertures; and a pair of second electrodes capacitively coupled to the resonant member that are arranged respectively in the pair of second apertures.

In one example of the fourth aspect, the pair of first electrodes are aligned on a first axis that extends through a center of each first electrode, the pair of second electrodes are aligned on a second axis that extends through a center of each second electrode, and the first axis is substantially perpendicular to the second axis.

It is to be understood that both the foregoing general description and the following detailed description present example and explanatory embodiments. The accompanying drawings are included to provide a further understanding of the described embodiments and are incorporated into and constitute a part of this specification. The drawings illustrate various example embodiments.

BRIEF DESCRIPTION OF DRAWINGS

The foregoing and other aspects of the present invention will become apparent to those skilled in the art to which the present invention relates upon reading the following description with reference to the accompanying drawings, in which:

FIG. 1 is a schematic plan view of an example sensing device;

FIG. 2 is an enlarged view of the sensing device in FIG. 1;

FIG. 3 is an enlarged, schematic plan view of an example decoupling mechanism of the sensing device;

FIG. 4 is a schematic plan view of another embodiment of the sensing device;

FIG. 5 is a schematic plan view of yet another embodiment of the sensing device;

FIG. 6 is an example sensing device in the prior art; and

FIG. 7 is an enlarged view of the sensing device in FIG. 6.

DESCRIPTION OF EMBODIMENTS

Example embodiments are described and illustrated in the drawings. These examples are not intended to be a limitation on the present invention. For example, one or more aspects can be utilized in other embodiments and even other types of devices. Moreover, certain terminology is used herein for convenience only and is not to be taken as a limitation.

Turning to FIG. 1, an example sensing device 10 includes a resonant member 12, an anchor 14 that is fixed to a substrate 16 and flexibly supports the resonant member 12, and a plurality of electrodes 18 that are capacitively coupled to the resonant member 12. The sensing device 10 in the present embodiment corresponds to a MEMS gyroscope. However, the sensing device 10 can correspond to other sensing devices in other examples such as a MEM accelerometer.

The resonant member 12 is flexibly supported by the anchor 14 such that the resonant member 12 is movable in two resonant modes a drive mode and a sense mode. In the present embodiment, two of the electrodes 18*a*, 18*c* are drive electrodes that are operable to capacitively induce a driving force to the resonant member 12 in an X direction so as to excite the resonant member 12 and vibrate the resonant member 12 in the drive mode at a particular frequency (e.g., the resonant member's natural frequency). If the resonant member 12 is rotated, the Coriolis Effect will transfer energy from the drive mode to the sense mode and cause the resonant member 12 to vibrate in the sense mode. Moreover, two of the electrodes 18*b*, 18*d* are sense electrodes that are configured to capacitively generate a current in response to sense-mode movement of the resonant member 12 in a Y direction that is perpendicular to the X direction. This current can thus be analyzed to determine the rotation rate of the resonant member 12. Each electrode 18 is preferably aligned with a node axis of the resonant member 12. For example, the centers of the drive electrodes 18*a*, 18*c* in the present embodiment are aligned with a first node axis α that passes through two node points 34*a*, 34*c* of the resonant member 12, and the centers of the sense electrodes 18*b*, 18*d* are aligned with a second node axis β that passes through two other node points 34*b*, 34*d* of the resonant member 12 and is substantially perpendicular to the first node axis α (for the purposes of this disclosure, "substantially perpendicular" means 1 degrees or less from perpendicular, and preferably 0.5 degrees or less from perpendicular, and more preferably 0.1 degrees or less from perpendicular). The two node points 34*a*, 34*c* correspond to nodes of the resonant member 112 in sense mode and antinodes of the resonant member 12 in drive mode, while the other two node points 34*b*, 34*d* correspond to antinodes of the resonant member 12 in sense mode and nodes of the resonant member 12 in drive mode.

However, it is to be appreciated that the electrodes 18 can be arranged differently and/or provide different capacitive functions in other examples. For example, one or more electrodes 18 can correspond to a tuning or alignment electrode. As another example, one or more electrodes 18 can be aligned along or offset from different node axes that are substantially oblique to each other. Furthermore, one or more electrodes 18 can each comprise a plurality of electrodes that are electrically connected to each other. Still further, the associated node points 34 of each electrode 18 may correspond to other nodes or antinodes of one or more resonant modes. The electrodes 18 can be configured in a variety of different manners without departing from the scope of this disclosure.

The resonant member 12 comprises a main body 36 having a center of mass cm that is aligned with a central axis ω of the anchor 14. The shape of the main body 36 can vary by embodiment. In the present example, the main body 36 is a planar body that extends along the X-Y plane and circumscribes the anchor 14. In particular, the main body 36 has an inner perimeter 38 that defines an opening 40 extending through the main body 36 for the anchor 14 to reside in. The main body 36 further has an outer perimeter 42.

The main body 36 can be made of a single-crystal or polycrystalline solid. For instance, the main body 36 in the present embodiment comprises a single-crystal solid and more specifically, (100)-oriented single-crystal silicon. However, the main body 36 can comprise other orientations of single-crystal silicon such as, for example, (111) and (110). Moreover, the main body can comprise other single-crystal solids such as beryllium.

One aspect of the sensing device 10 relates to embodiments in which the main body 36 comprises a single-crystal solid. In such embodiments, the main body 36 will have a material stiffness that is direction dependent. For instance, the main body 36 in the present example has a material stiffness that varies radially about the central axis ω of the anchor 14 such that the main body 36 has a first material stiffness in a first radial direction $R_1$ and a second material stiffness in a second radial direction $R_2$ that is less than the first material stiffness. The first radial direction $R_1$ is aligned with the first node axis a of the resonant member 12, and the angle between the first and second radial directions $R_1$, $R_2$ is about 45 degrees such that the first and second radial directions $R_1$, $R_2$ are non-orthogonal to each other. The material stiffness of the main body 36 along radial directions between the first and second radial directions $R_1$, $R_2$ will gradually transition from the first material stiffness in the first radial direction $R_1$ to the second material stiffness in the second radial direction $R_2$. Moreover, the material stiffness of the main body 36 will periodically alternate between the first and second material stiffnesses every 45 degrees about the central axis ω. However, it is to be appreciated that the first and second radial directions $R_1$, $R_2$ can be located at other angles about the central axis w. Moreover, the period in which material stiffness changes about the central axis ω can be different in other embodiments. To compensate for anisotropic material stiffness of the main body 36, the geometry of the main body 36 can be optimized to mimic the behavior of an isotropic material and achieve low instantaneous momentum flow along any arbitrary in-plane direction. In particular, the geometry of the main body 36 can be varied about the central axis ω such that the component stiffness of the main body 36 is substantially isotropic. For example, a radial distance r between the central axis ω and the outer perimeter 42 of the main body 36 can vary about the central axis ω so that radial segments with greater material stiffness have a greater radial distance r than radial segments with lower material stiffness. In addition or alternatively, the main body 36 can be formed such that radial segments with greater material stiffness define one or more apertures 44 that extend through the main body 36, while radial segments with lower material stiffness define no apertures or define apertures that are fewer in number and/or smaller in size.

The present embodiment employs both approaches, such that a radial distance $r_1$ in the first radial direction $R_1$ is greater than a radial distance $r_2$ in the second radial direction $R_2$, and an aperture 44b is located along the first radial direction $R_1$ while no aperture is located along the second radial direction $R_2$ between the inner and outer perimeters 40, 42 of the main body 36. Indeed, the radial distance r between the central axis ω and outer perimeter 42 varies continuously around the central axis ω such that the outer perimeter 42 has four convex portions 42a that are interconnected by four concave portions 42b.

By varying the configuration of the main body 36 about the central axis ω to compensate for anisotropic material stiffness, the component stiffness of the main body 36 can be made substantially isotropic such that component stiffnesses in different radial directions of the main body 36 are substantially similar to each other (for the purposes of this disclosure, two component stiffnesses in different radial directions are "substantially similar" if their ratio is from 0.9 to 1.1, and preferably from 0.95 to 1.05, and more preferably from 0.98 to 1.02). For instance, the main body 36 in the present embodiment has a first component stiffness in the first radial direction $R_1$ and a second component stiffness in the second radial direction $R_2$ that is substantially similar to the first component stiffness. Accordingly, an imbalance of momentum forces that results at the anchor 14 due to anisotropic component stiffness can be prevented or mitigated. For instance, in some examples, a net momentum force applied to the anchor 14 from vibration in one or both of sense mode and drive mode is preferably 0.1 pN or less, and more preferably 0.01 pN or less, and still more preferably 0.0001 or less.

It is to be appreciated that the configuration of the main body 36 can be varied about the central axis ω of the anchor 14 in a variety of different ways to compensate for anisotropic material stiffness and result in a component stiffness for the main body 36 that is substantially isotropic. For instance, the radial distance r between the central axis ω and the outer perimeter 42 of the main body 36 can be relatively constant about the central axis ω while one or more apertures 44 are provided in stiffer radial segments of the main body 36 to compensate for anisotropic material stiffness. As another example, main body 36 can be apertureless while the radial distance r between the central axis ω End the outer perimeter 42 of the main body 36 is varied about the central axis ω to compensate for anisotropic material stiffness.

Moreover, the main body 36 may comprise a polycrystalline solid having isotropic material stiffness in some examples such that the configuration of the main body 36 can be relatively constant about the central axis ω while having isotropic component stiffness. Still further, the main body 36 can be configured in some examples such that its component stiffness is anisotropic or partially isotropic about the central axis ω regardless of its material.

Another aspect of the sensing device 10 relates to an arrangement of its electrodes 18. More specifically, as shown in FIG. 1, one or more electrodes 18 of the sensing device 10 can be arranged within associated apertures defined by the main body 36 of the resonator 12. In the present embodiment, the electrodes 18 are arranged within the apertures 44 described above that compensate for the main body's anisotropic material stiffness. However, the electrodes 18 can be arranged in other apertures that do not serve to compensate for anisotropic material stiffness, such as in embodiments wherein the main body 36 has isotropic material stiffness.

The electrodes 18 can be arranged in their associated apertures 42 such that for each electrode 18, a capacitive channel 50 is defined between the electrode 18 and main body 36 that circumscribes (i.e., completely surrounds) the electrode 18. Moreover, each electrode 18 and associated aperture 44 can be located a long an associated node axis of the resonant member 12. For example, the electrodes 18a, 18c and apertures 44a, 44c in the present embodiment are located along the first node axis α such that the electrodes 18a, 18c and apertures 44a, 44c are respectively concentric with the node points 34a, 34c. Similarly, the electrodes 18b, 18d and apertures 44b, 44d in the present embodiment are located along the second node axis β such that the electrodes 18b, 18d and apertures 44b, 44d are respectively concentric with the node points 34b, 34d. However, the electrodes 18 and apertures 44 can be arranged at other locations in other embodiments.

An enlarged view of the sense electrode 18b and its associated aperture 44b and capacitive channel 50b is shown in FIG. 2 in a stationary state of the main body 36, which will now be described in further detail. However, it is to be appreciated that the structure described with respect to the sense electrode 18b can be similarly applied to the other electrodes 18 of the sensing device 10.

As shown in FIG. 2, the main body 36 has a capacitive surface 52b that defines the aperture 44b and circumscribes the electrode 18b. Meanwhile, the electrode 18b has a capacitive surface 54b that extends completely about the electrode 18b and is spaced from the capacitive surface 52b of the main body 36 by the capacitive channel 50b. The capacitive surfaces 52b, 54b of the main body 36 and electrode 18b are capacitively coupled such that the electrode 18b is capacitively coupled to the main body 36 about an entire outer perimeter of the electrode 18b. The electrode 18b and aperture 44b in FIG. 2 are substantially circular in shape such that their capacitive surfaces 52b, 54b are cylindrical. However, it is to be appreciated that the shapes of these features can vary in other embodiments. For instance, the electrode 18b and aperture 44b can be substantially square in shape such that their capacitive surfaces 52b, 54b each comprise four, substantially planar surface portions.

The capacitive channel 50b follows a continuous path 60b around the electrode 18b and preferably has a line of symmetry 64b that is substantially parallel with the drive direction (i.e., X direction) of the resonant member 12 (For the purposes of this disclosure, a line of symmetry for a capacitive channel is "substantially parallel" to the drive direction if the line of symmetry and drive direction are 1 degrees or less from parallel, and preferably 0.1 degrees or less from parallel, and more preferably 0.01 degrees or less from parallel. In some examples, the capacitive channel 50b can have additional lines of symmetry that are, for example, perpendicular to the line of symmetry 64b.

To enable such symmetry of the capacitive channel 50b, the continuous path 60b of the capacitive channel 50b is preferably symmetric in shape, and the capacitive channel 50b preferably has a width w (measured as the distance between capacitive surfaces 52b, 54b) that is substantially constant along the continuous path 60b of the capacitive channel 50b. For the purposes of this disclosure, a width of a capacitive channel is substantially constant along a given path if a maximum variance of the width is 7% or less, and preferably 1% or less, and more preferably 0.5% or less. For instance, a maximum variance of the width in some examples can be 20 nm or less, and preferably 5 nm or less, and more preferably 1 nm or less.

Because the capacitive channel 50b of the electrode 18b has a line of symmetry 64b that is substantially parallel with the drive direction X of the electrode 18b, a cross-sectional area 70b' of the capacitive channel 50b on one side of the line of symmetry 64b will be substantially equal to a cross-sectional area 70b" of the capacitive channel 50b on an opposite side of the line of symmetry 64b (the cross-sectional areas 70b', 70b "being taken along the X-Y plane). Moreover, these cross-sectional areas 70b", 70b" will remain substantially equal to each other as the resonant member 12 moves in the drive direction X in drive mode. Thus, capacitive transduction of sense mode current that would normally be caused by a difference in cross-sectional areas 70b', 70b" is zero, and the ZRO effect described above can be prevented.

Moreover, as noted above, the fabrication process that is commonly used to form capacitive channels between electrodes and a resonant member in a sensor device can form imperfections in the capacitive surface portions at the ends of the channel. However, because the capacitive channel 50b in the present embodiment is a continuous channel that circumscribes the electrode 18b, there are no end portions of the capacitive channel 50b that are likely to cause imperfections in the capacitive surfaces 52b, 54b of the main body 36 and electrode 18b, thereby further preventing the ZRO effect that is caused by asymmetries in a capacitive channel.

It is to be appreciated that the structure described above with respect to the sense electrode 18b, aperture 44b, and capacitive channel 50b shown in FIG. 2 can be similarly applied to the other electrodes 18 of the sensing device 10. Such structure can similarly prevent the ZRO effect at those electrodes 18.

As noted above with reference to FIG. 1, the resonant member 12 is flexibly supported by the anchor 14 such that the resonant member 12 is movable in two resonant modes—the drive mode and sense mode. U.S. Patent Application Publication No. 2016/0327390, which is incorporated herein by reference in its entirety, discloses various example structures (referred to as "decoupling mechanisms") for flexibly supporting a resonant member relative to a substrate that can be applied to the sensing device 10 of the present disclosure. These structures are referred to as "decoupling mechanisms" because they attach the resonant member to a support structure (e.g., anchor) such that the resonant Member is flexibly supported while mitigating energy transfer (i.e., energy loss) of the resonant member to the anchor. Such energy transfer can get coupled to another mode (e.g., sense mode) from the resonant member and further cause the ZRO effect described above.

One specific example of a decoupling mechanism 80 is illustrated in FIG. 3 of the present disclosure, which includes a flange 82 that circumscribes and is directly connected to the anchor 14 of the sensing device 10 described above. The decoupling mechanism 80 further includes a plurality ring portions 84 including a first ring portion 84a that circumscribes and is radially spaced from the flange 82, a second ring portion 84b that circumscribes and is radially spaced from the first ring portion 84a, and a third ring portion 84c that circumscribes and is radially spaced from the second ring portion 84b. The third ring portion 84c is circumscribed by the main body 36 of the resonant member 12 such that the main body 36 is radially spaced from the third ring portion 84c.

Moreover, the decoupling mechanism 80 includes a plurality of connecting portions 86 including a plurality of first connecting portions 86a that connect the first ring portion 84a to the flange 82, a plurality of second connecting portions 86b that connect the second ring portion 84b to the first ring portion 84a, a plurality of third connecting portions 86c that connect the third ring portion 84c to the second ring portion 84b, and a plurality of fourth connecting portions 86d that connect the third ring portion 84c to the main body 36.

The plurality of connection portions 86 are located about the central axis w of the anchor 14 such that the first connecting portions 86a are circumferentially aligned with each other and circumferentially spaced by an angle θ1, the second connecting portions 86b are circumferentially aligned with each other and circumferentially spaced by the angle θ1, the third connecting portions 86c are circumferentially aligned with each other and circumferentially spaced by the angle θ1, and the fourth connecting portions 86d are circumferentially aligned with each other and circumferentially spaced by the angle θ1, wherein the angle θ1 is 22.5 degrees. Additionally, each first connecting portion 86a is radially aligned with an associated third connecting portion 86c, and each second connecting portion 86b is radially aligned with an associated fourth connecting portion 86d. The first and third connecting portions 86a, 86c are radially offset from the second and fourth connecting portions 86b, 86d by an angle θ2 that is 12.25 degrees.

The ring portions 84 of the decoupling mechanism 80 above act as buffer that reduce anchor loss to the anchor 14. It is possible to further reduce energy loss by implementing additional rings 84 and connecting portions 86 that connect the additional rings 84 to the three rings 84a, 84b, 84c above. However, implementing extra rings may lower the resonant frequency of some modes and adversely impact the vibration immunity of the sensing device 10. It has been found that a four-ring design can substantially reduce energy loss while also ensuring that the lowest mode frequency is not too low.

FIG. 4 illustrates an embodiment of the sensing device 10 wherein the outer periphery 42 of the main body 36 is a circle. In this case, the drive mode executes negligible normal displacement at the sense electrodes 18b, 18d. Capacitive transduction of this mode is negligible as electrostatic forces are approximately perpendicular to the resonator boundary.

FIG. 5 illustrates an embodiment of the sensing device 10 wherein a plurality of release holes 92 are arranged so as to form an equilateral triangle when connecting specific three release holes 92.

This application has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A sensing device comprising:
   an anchor having a central axis that defines a first radial direction and a second radial direction; and
   a resonant member flexibly supported by the anchor that comprises a main body made of a single-crystal solid, wherein the main body has a first material stiffness in the first radial direction and a second material stiffness in the second radial direction that is less than the first material stiffness, and
   the main body has a first component stiffness in the first radial direction and a second component stiffness in the second radial direction that is substantially similar to the first component stiffness.

2. The sensing device of claim 1, wherein the resonant member is movable in a resonant mode and the main body of the resonant member is shaped such that a net momentum force applied to the anchor from the resonant member from vibration in the resonant mode is 0.1 pN or less.

3. The sensing device of claim 1, wherein a first distance between the central axis and an outer perimeter of the main body in the first radial direction is greater than a second distance between the central axis and the outer perimeter of the main body in the second radial direction.

4. The sensing device of claim 1, wherein the main body defines an aperture located along the first radial direction that extends through the main body.

5. The sensing device of claim 4, wherein the main body has no aperture located along the second radial direction between an inner perimeter and outer perimeter of the main body.

6. The sensing device of claim 4, further comprising an electrode capacitively coupled to the resonant member, wherein the electrode is located in the aperture such that a capacitive channel is defined between the electrode and the main body that circumscribes the electrode.

7. The sensing device of claim 6, wherein the electrode is capacitively coupled to the main body about an entire outer perimeter of the electrode.

8. The sensing device of claim 6, wherein the capacitive channel has a line of symmetry that is substantially parallel to a drive direction of the resonant member.

9. The sensing device of claim 1, wherein the single-crystal solid is silicon.

10. The sensing device of claim 9, wherein the single-crystal solid is (100) oriented silicon.

11. The sensing device of claim 1, wherein an angle between the first radial direction and second radial direction is about 45 degrees.

12. A gyroscope comprising the sensing device of claim 1.

13. A sensing device comprising:
   an anchor having a central axis that defines a first radial direction and a second radial direction; and
   a resonant member flexibly supported by the anchor that comprises a main body made of a single-crystal solid, wherein the resonant member is movable in a resonant mode and the main body of the resonant member is shaped such that a net momentum force applied to the anchor from the resonant member from vibration in the resonant mode is 0.1 pN or less.

14. A sensing device comprising:
   a resonant member having a main body that defines an aperture extending through the main body; and
   an electrode capacitively coupled to the resonant member, wherein the electrode is located in the aperture such that a capacitive channel is defined between the electrode and the main body that circumscribes the electrode: and
   an anchor having a central axis that defines a first radial direction and a second radial direction, wherein:
   the resonant member is flexibly supported by the anchor,
   the main body of the resonant member is made of a single-crystal solid and has a first material stiffness in the first radial direction and a second material stiffness in the second radial direction that is less than the first stiffness, and
   the aperture is located along the first direction.

15. The sensing device of claim 14, wherein the electrode is capacitively coupled to the main body about an entire outer perimeter of the electrode.

16. The sensing device of claim 14, wherein the capacitive channel follows a continuous path and has a width that is substantially constant along the continuous path.

17. The sensing device of claim 14, wherein the capacitive channel has a line of symmetry that is substantially parallel to a drive direction of the resonant member.

18. The sensing device of claim 14, wherein a first distance between the central axis and an outer perimeter of the main body in the first radial direction is greater than a second distance between the central axis and the outer perimeter of the main body in the second radial direction.

19. A gyroscope comprising the sensing device of claim 14.

\* \* \* \* \*